United States Patent [19]
Smith et al.

[11] Patent Number: 5,634,075
[45] Date of Patent: May 27, 1997

[54] BACKWARD COMPATIBILITY FOR PLUG AND PLAY SYSTEMS

[75] Inventors: Stephen A. Smith, Palo Alto; Suhas A. Shetty, Sunnyvale; Daniel G. Bezzant, Pleasanton, all of Calif.

[73] Assignee: Cirrus Logic, Inc., Fremont, Calif.

[21] Appl. No.: 371,304

[22] Filed: Jan. 11, 1995

[51] Int. Cl.$^6$ .................................................. G06F 13/00
[52] U.S. Cl. ............................................ 395/829; 395/282
[58] Field of Search .................................. 395/821, 829, 395/832, 828, 836, 882, 282

[56] References Cited

U.S. PATENT DOCUMENTS

| | | | |
|---|---|---|---|
| 4,360,870 | 11/1982 | McVey | 395/821 |
| 4,675,813 | 6/1987 | Locke | 395/821 |
| 4,755,934 | 7/1988 | Inoue | 395/821 |
| 4,964,038 | 10/1990 | Louis et al. | 398/829 |
| 5,038,320 | 8/1991 | Heath et al. | 395/832 |
| 5,056,060 | 10/1991 | Fitch et al. | 395/821 |
| 5,201,055 | 4/1993 | Izquierdo et al. | 395/800 |
| 5,220,673 | 6/1993 | Dalrymple et al. | 395/775 |
| 5,301,276 | 4/1994 | Kimura | 395/829 |
| 5,317,693 | 5/1994 | Cuenod et al. | 395/829 |
| 5,367,640 | 11/1994 | Hamilton et al. | 395/829 |
| 5,465,330 | 11/1995 | Komatsu et al. | 395/200.1 |
| 5,491,830 | 2/1996 | Ferri | 395/829 |
| 5,517,646 | 5/1996 | Piccirillo et al. | 395/700 |

FOREIGN PATENT DOCUMENTS

| | | |
|---|---|---|
| 0443876A2 | 2/1991 | European Pat. Off. . |
| 0443876A3 | 2/1991 | European Pat. Off. . |
| 0465079A3 | 6/1991 | European Pat. Off. . |
| 0465079A2 | 6/1991 | European Pat. Off. . |
| 0465079A2 | 1/1992 | European Pat. Off. . |

OTHER PUBLICATIONS

Feb. 1991 "Plug and Play ISA Specifications" Version 1.0A (c) Copyright 1993, 1994 by Intel Corporation and Microsoft Corporation.

*Primary Examiner*—Ayaz R. Sheikh
*Attorney, Agent, or Firm*—Robert P. Bell; J. P. Violette

[57] ABSTRACT

A device for use in a computer system, particularly a personal computer (PC) which provides compatibility for a proposed ISA plug and play (PNP) standard. The device of the present invention is also backward compatible with non-PNP (legacy) PCs. Upon power-up, a device may initialize using default traditional or specification (ISA) values for I/O address, IRQ and DMA channels. If PNP activity by the host PC is detected by the device, the device is disabled, and awaits activation and I/O address, IRQ and DMA channel assignments from a host PC. If no PNP activity by a host PC is detected, the device continues to operate using default traditional or specification (ISA) I/O address, IRQ and DMA channels. The device of the present invention may be installed in PNP or legacy type PCs without reconfiguring hardware (e.g., DIP switches, jumpers or the like) in the device or installing new firmware, operating system, or applications software in a host PC.

13 Claims, 9 Drawing Sheets

BACKWARD COMPATIBILITY FOR PLUG AND PLAY SYSTEMS

FIELD OF THE INVENTION

The present invention relates generally to the computer field, particularly for computer accessories using a proposed ISA plug and play specification.

BACKGROUND OF THE INVENTION

Personal computers (e.g. IBM™ PCs, ISA, EISA or Macintosh™ systems or the like) may be provided with provisions for adding devices to the computer system. For example, an ISA (Industry Standards Association) type personal computer (PC) may be provided with so-called expansion slots coupled to the system bus for receiving device "cards" which plug into such expansion slots. Other types of expansion techniques may also be used, such as a PCMCIA (Personal Computer Memory Card Interface Association) slot, SCSI (Small Computer Serial Interface) port or the like. In addition, devices may be interfaced with a personal computer using existing I/O ports such as serial or parallel ports.

Examples of devices which may be added to a computer through expansion slots or the like include modems, network cards, add-on memory cards, multimedia cards, sound cards (e.g., Soundblaster™ card or the like), hard drive and/or floppy drive controllers, I/O devices or the like. A device may comprise one or more logical devices, each of which may be assigned system resources such as an I/O address, interrupt level, and DMA channel. Devices may also be provided on the PC system motherboard, such as internal memory, keyboard controller, hard and floppy drive controller, video controller, or the like, and may also be assigned I/O addresses, interrupt levels, and DMA channels. For the purposes of this application, the term "device" shall refer to such add on or internal devices for a PC.

An I/O address may be an address location (e.g., hexadecimal) which a device uses on a system bus to determine whether or not a particular CPU cycle is designated for that device. The I/O address may generally be a sixteen bit address within the first 64K of memory for an ISA type PC. A DMA channel is a channel (e.g., 0-7) between a device and a DMA controller in a computer system used in order to obtain direct memory access (DMA) services from the DMA controller. The interrupt (IRQ) level is used as a priority level to get the attention of a host CPU. Different devices within a computer system may have different interrupt priority levels. If two or more interrupts are received simultaneously, a host PC can prioritize which interrupt request to honor (and in which order) by priority level.

In the prior art, such I/O addresses, interrupt levels, and DMA channels may be predetermined according to an industry standard. For example, in an ISA type PC, I/O addresses, interrupt levels, and DMA channels for I/O ports (e.g., COM1, COM2, LPT1, LPT2 or the like) may be predetermined and preassigned according to an industry standard. Similarly, I/O addresses, interrupt levels, and DMA channels for other devices may be similarly predetermined and preconfigured. Thus, if a user installs an expansion device (e.g., modem) into an ISA type PC, software operating within the ISA type PC will expect the expansion device to operate according to predetermined parameters (i.e., I/O address, interrupt level, and DMA channel). Thus, for example, for a modem installed as an expansion device, software operating within an ISA type PC may expect I/O access at a particular address and DMA accesses through a particular channel.

Prior art PC expansion techniques, however, have some disadvantages. For example, since a device may have a particular predetermined I/O address, interrupt level, and/or DMA channel, it may be difficult to install a number of such devices within one PC without a conflict arising between I/O addresses, interrupt levels, and DMA channels of different devices. For example, a network card may be incompatible with a fax/modem card, as both devices may expect to use the same I/O address, interrupt level, and/or DMA channel. Thus, a user may have to select one card over another or reconfigure the PC.

FIG. 1 illustrates the sequence of steps occurring on power up in a prior art ISA type PC. In step 100, power is applied to the PC. In step 102, each ISA compatible device is powered up, with fixed I/O address, interrupt (IRQ) levels, DMA channels, and other assignment of system resources. In step 104, software from the ROM BIOS (i.e., so-called firmware) in the PC is executed and the PC then boots from a boot device (e.g., hard drive). For the sake of illustration, the POST (Power on Self Test), which generally occurs before the software in the ROM BIOS is executed, is not shown in step 104. In step 106, an operating system is then loaded from the boot device and executed. As can be seen from FIG. 1, I/O addresses, interrupt levels, and DMA channels are fixed by hardware and generally may not be changed.

It may be possible to reconfigure a PC or a device to overcome such a problem. For example, software may be provided with an expansion device to reconfigure the PC after power up to alter the predetermined I/O addresses, interrupt levels, and DMA channels. A user may install such software in a PC to operate upon power-up or reset (e.g., as an AUTOEXEC.BAT file or as a device driver in a CONFIG.SYS file) to reconfigure default I/O addresses, interrupt levels, and/or DMA channels in the ROM BIOS of a PC. Alternately, the device may be altered by use of jumper blocks, DIP switches, or the like, to reconfigure the device to use a different I/O address, interrupt level, and/or DMA channel.

While such reconfiguration techniques may be feasible, they may present additional difficulties and inherent limitations. For example, many users may be unfamiliar with the basic operation of a PC and thus may require assistance to install reconfiguration software. Further, such software adds additional cost to a device. Users unfamiliar or uncomfortable with the use of electronics may have difficulty setting jumpers, DIP switches and the like. Such jumpers, DIP switches, and the like add additional cost to a device.

Moreover, such reconfiguration techniques may still only allow for a limited number of devices to be configured within one PC. For special applications, a user may wish to add a number of similar of dissimilar devices to a PC. For example, to make copies of software, a user may wish to add a large number of floppy disc driver controllers to one PC to drive a large number of floppy disc drives. Similarly, a user may wish to add a large number of PCMCIA host card adapters to store data to PCMCIA memory cards.

Recently, a new technique for configuring a computer system has been proposed known as a Plug and Play (PNP) system. A preliminary specification has been proposed for such a PNP system for use in ISA type PCs. This specification, entitled, "Plug and Play ISA Specification, Version 1.0a" dated May 5, 1994, is incorporated herein by reference. For the purposes of this application, a computer system (e.g., ISA type PC) supporting the PNP specification and protocols may be referred to as a PNP type system or PNP type PC.

In a first kind of PNP type system, software stored in a PCs ROM BIOS may configure a system after power up to assign I/O addresses, interrupt levels, and DMA channels to each device in a system. Devices built according to the PNP specification may operate in conjunction with software provided in the ROM BIOS. FIG. 2 illustrates the steps in the process of configuring this first type of PNP type system using firmware (i.e., ROM BIOS).

In step 100, power is applied to a PC. In step 113, PNP devices required for system boot may become active on power up using power-up default I/O addresses, interrupt levels, and DMA channels. Examples of devices required for system boot may include hard and floppy disc drive controllers, keyboard controllers, display controllers (e.g., VGA controller) or the like. For a system booting off a network (e.g., Novell™ type network) a network card may be considered a device required for system boot. Default I/O addresses, interrupt levels, and DMA channels may be preassigned and may be those addresses used under the current ISA (i.e., non-PNP) standard or traditional industry addresses.

PNP devices not required for system boot may power up in an inactive state. Examples of PNP devices not required for system boot may include modems, parallel or serial I/O ports, sound cards, or the like. Such devices may not be required for system boot and initial loading of operating system and the like.

What is considered a device required or not required for system boot may depend upon the configuration of the system (e.g., network boot versus hard drive or floppy drive boot). It should be noted that whether a device is required for system boot may be preconfigured within a PNP device. Thus, for example, a PNP hard drive controller may be preconfigured as a device required for system boot. For a PNP type system booting off a network servel, a network card may be preconfigured as a PNP device required for system boot. Such configuration may be hard wired into the device (e.g., hard drive controller, floppy drive controller) or may be selectable using jumpers, DIP switches or the like (e.g., network card).

In step 114, the program in ROM BIOS may isolate each PNP device, assign a "handle" (number) to each card, and read the resource data from that card. Once each card had been isolated, assigned a handle and read, the software in ROM BIOS will check for conflict in the devices required for boot, and activate each boot device. Optionally, at this time, the software in the ROM BIOS may configure other devices within the PC, or leave them in an inactive state. The PC may then boot, for example, from a hard drive and load and execute an operating system (e.g., MS-DOS™, O/S-2™, WINDOWS™, UNIX™ or the like).

In step 126, the operating system may then retrieve PNP information from the ROM BIOS, read resource data from all devices, and arbitrate system resources for all PNP devices. Conflict-free resources may then be assigned for all inactive devices and the devices activated. Finally, appropriate device drivers may be loaded and the system is thus configured.

The system of FIG. 2 may be used in new ISA type PCs to provide PNP compatibility. However, there is already a large installed base of older ISA type PCs throughout the world (e.g., PCs built around the Intel™ 8086, 8088, 80186, 80286, 80386, 80486, or Pentium™ microprocessors, ADM™ 386 and 486 processors, or PowerPC™ processors). For the purposes of this application, such non-PNP systems may be referred to as legacy PCs. It may be possible to upgrade a legacy PC by installing a new ROM BIOS. However, such a technique may be expensive and difficult to implement, particularly if the ROM BIOS is not provided on a separate, removable chip.

To overcome this difficulty, operating systems employing PNP technology have been proposed. For example, the proposed Windows 95™ operating system (formerly Windows™ Chicago) may incorporate such PNP software to support the PNP standard. Alternately, or in addition, DOS, O/S-2™, or UNIX™ operating systems may be upgraded to support the PNP standard.

FIG. 3 illustrates the steps in powering up a computer using a PNP compatible operating system. Such an operating system may be retrofit to a legacy PC. In step 100, power is applied to a PC. In step 113, PNP devices required for system boot become active on power up using power up default I/O addresses, interrupt levels, and DMA channels. PNP devices not required for system boot are inactive on power up.

In step 104 the program on the ROM BIOS of the PC may be executed and the PC will boot from its boot device (e.g., hard drive, floppy drive, network card, or the like). In step 116, the operating system may be loaded. The operating system software may be provided with support for PNP devices. In a similar manner to the ROM BIOS software of FIG. 2, the operating system will isolate each PNP device, assign a "handle" (number) to each card, and read the resource data from that card. Once each card had been isolated, assigned a handle and read, the operating system software will arbitrate system resources for all PNP devices. Conflict-free resources may then be assigned and the devices activated. Finally, appropriate device drivers may be loaded and the system is thus configured.

Applications software accessing a device then receives from the operating system software the address locations for that device. Thus, for example, a modem card using PNP technology may be assigned system resources by a PNP compatible operating system according to the PNP protocol. Applications software (e.g., communications program or the like) may then communicate with the operating system to determine the address locations of the modem card in order to communicate with the device.

The system of FIG. 3 has the advantage in that it may be more readily implemented in legacy PCs by upgrading the operating system (e.g., Windows™ or DOS) to an operating system supporting PNP technology. However, a user may not wish to upgrade his operating system merely to provide software support for a PNP device. For example, a legacy user who wishes to install a new sound card, CD-ROM controller or the like may not wish to go through the expense and effort of installing a new operating system merely to provide compatibility for a PNP type device.

Such a user may instead wish to purchase a non-PNP type device. As a result, a manufacturer of a device may lose market share unless a given device is offered in both PNP and non-PNP compatible configurations or is provided with an internal jumper, DIP switch or the like to disable PNP modes of operation. The former approach may be costly in terms of manufacturing and inventory expense and may delay widespread use of PNP technology. The latter approach, providing a DIP switch or the like, defeats the fundamental precept of PNP technology—namely to allow a user to "plug" in a new device without such configuration steps.

Moreover, it may be possible that existing applications software may not be compatible with an operating system supporting the PNP standard. For example, a communications program may be configured to send and receive data from one of a number of predetermined I/O addresses (e.g., COM1:, COM2:, or the like). If such I/O addresses are reassigned, an applications program not designed for the PNP standard may not be able to communicate with the device and thus not operate properly.

FIG. 4 illustrates a third embodiment for implementing PNP technology using applications software. In FIG. 4, steps 100, 102, 104 and 106 are executed in a similar manner to that shown in FIG. 1. However, once the operating system is executed, an application program may then be executed to provide PNP support in step 146.

Such an applications programs may be executed after boot (e.g., AUTOEXEC.BAT or WINDOWS.INI file) or configured as a device driver (e.g., CONFIG.SYS file). Alternately, such applications software may be provided within an applications program (e.g., communications program, word processing program, or the like). Once executed, the applications program isolates each PNP device, assigns a "handle" (number) to each card, and reads the resource data from that card. Once each card had been isolated, assigned a handle and read, the applications program software will arbitrate system resources for all PNP devices. Conflict-free resources may then be assigned and the devices activated. Finally, appropriate device drivers may be loaded and the system is thus configured.

Although the PNP systems of FIGS. 2–4 provide PNP compatibility, such techniques may be unsuitable or may be undesirable (e.g., to expensive or complicated to install) for legacy PCs. As a large number of legacy PCs exist throughout the world, a manufacturer of a PNP device may desire to make a PNP device which may be applied to both PNP and non-PNP systems. In order to install a PNP device, a legacy user may either install a new PNP compatible operating system (FIG. 3) or install PNP compatible applications software (FIG. 4). If a legacy user does not install such software, a PNP device not required for system boot may be inactive upon power up and may not be subsequently activated.

In order to overcome this disadvantage, a supplier of PNP devices may either package his PNP device with applications software (or operating system) supporting PNP devices, or provide his PNP device with hardware configuration device (e.g., DIP switch, jumper block or the like) to disable the PNP function when used in a legacy PC. However, either approach may defeat the purpose of PNP technology, namely to provide a device which may be installed by a user without the need for supplemental software installation or device configuration.

Further, such packaged software or hardware configuration device may add additional cost to a PNP device. Moreover, if applications software is provided for each PNP device, and a legacy user installs a number of PNP devices in a legacy system, PNP applications software from different manufacturers may itself be incompatible. Thus, prior art PNP devices may not provide true plug and play compatibility for legacy PC users.

Moreover, for a semiconductor manufacturer, providing such plug and play technology may be disadvantageous from a marketing standpoint. When manufacturing and marketing a semiconductor device (e.g., video controller IC, interface IC, or the like), a manufacturer may be required to provide such PNP application software to a customer (e.g., device or computer manufacturer). Customers may or may not require PNP support for their products, however, the alternative of offering separate PNP and non-PNP compatible IC products may increase manufacturing and inventory costs, cause unnecessary confusion, and delay implementation of PNP technology.

SUMMARY AND OBJECTS OF THE INVENTION

A device for use with a computer including system data and address busses. The device is coupled to the computer system data and address busses. An I/O address register is provided in the device stores an I/O address for the device. The I/O address register is configured to output a default I/O address on powerup.

Control logic detects activity on the computer system data bus characteristic of a computer system attempting to assign I/O addresses to a device and disables the device upon such detection and allows a computer system to write an I/O address to the I/O address register. The control logic includes a linear feedback shift register receives an initiation key comprising a predetermined data sequence repeated a predetermined number of times. A comparator compares a received data sequence from the linear feedback shift register with the predetermined data sequence, the comparator outputs a comparison signal when a received data sequence is comparable to the predetermined data sequence. The comparison signal indicates an attempt by the computer system to initiate a routine to assign I/O addresses to devices.

A multiplexer generates a high level logic signal as a device enable signal upon reset and power-up. The multiplexer has another input coupled to the system data bus and receives a signal characteristic of a computer system attempting to enable a device after assigning an I/O address. The multiplexer receives as a switching signal the comparison signal from the comparator.

An activation register, coupled to the computer system data bus and the multiplexer, detects a signal from the computer system indicating an attempt by the computer system to activate a device after assigning an I/O address, the activation register outputs a signal to the device and the multiplexer indicative of such detection. A decoder detects a computer system address corresponding to a command for activating a device and outputs a signal indicative of such detection.

A DMA channel register stores a DMA channel for the device. The DMA channel register is configured to output a default DMA channel on power-up. The control logic, upon detecting activity on the computer system data bus characteristic of a computer system attempting to assign a DMA channel to a device, allows a computer system to write to the DMA channel register a DMA channel.

An interrupt level register stores an interrupt level for the device. The interrupt level register is configured to output a default interrupt level on power-up. The control logic, upon detecting activity on the computer system data bus characteristic of a computer system attempting to assign interrupt level to a device, allows a computer system to write to the interrupt level register an interrupt level.

It is therefore an object of the present invention to provide a PNP compatible device which is compatible with a legacy type computer system.

It is a further object of the present invention to provide true plug and play capability for a device for use in both PNP and non-PNP type computer systems.

It is a further object of the present invention to provide a plug and play compatible device which does not require additional configuration hardware to be implemented in a non-plug and play system.

It is a further object of the present invention to provide a plug and play compatible which may be implemented in a non-plug and play system without the need for plug and play firmware, operating system or applications software.

It is a further object of the present invention to provide a plug and play compatible device which may be implemented in a non-plug and play compatible system while maintaining plug and play compatibility.

BRIEF DESCRIPTIONS OF THE DRAWINGS

DETAILED DESCRIPTION OF THE INVENTION

Figure 1:
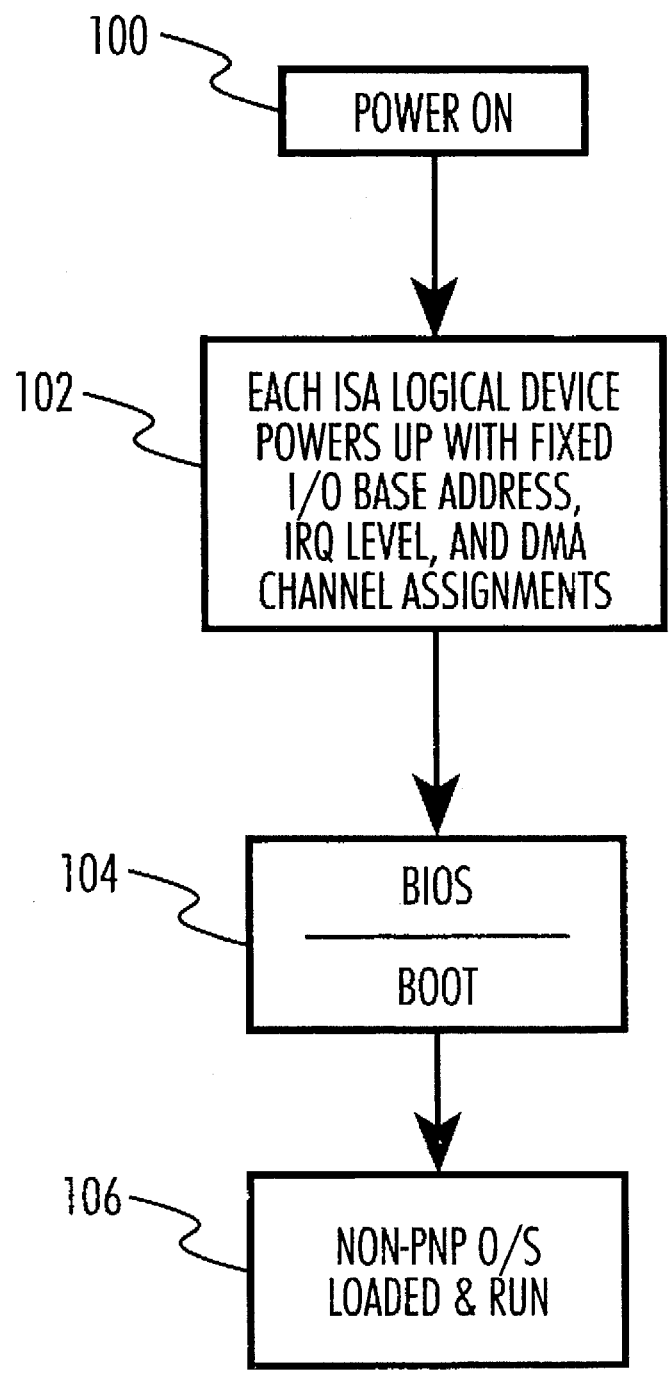
FIG. 1 illustrates the sequence of steps occurring on power up in a prior art ISA type PC.
Figure 2:
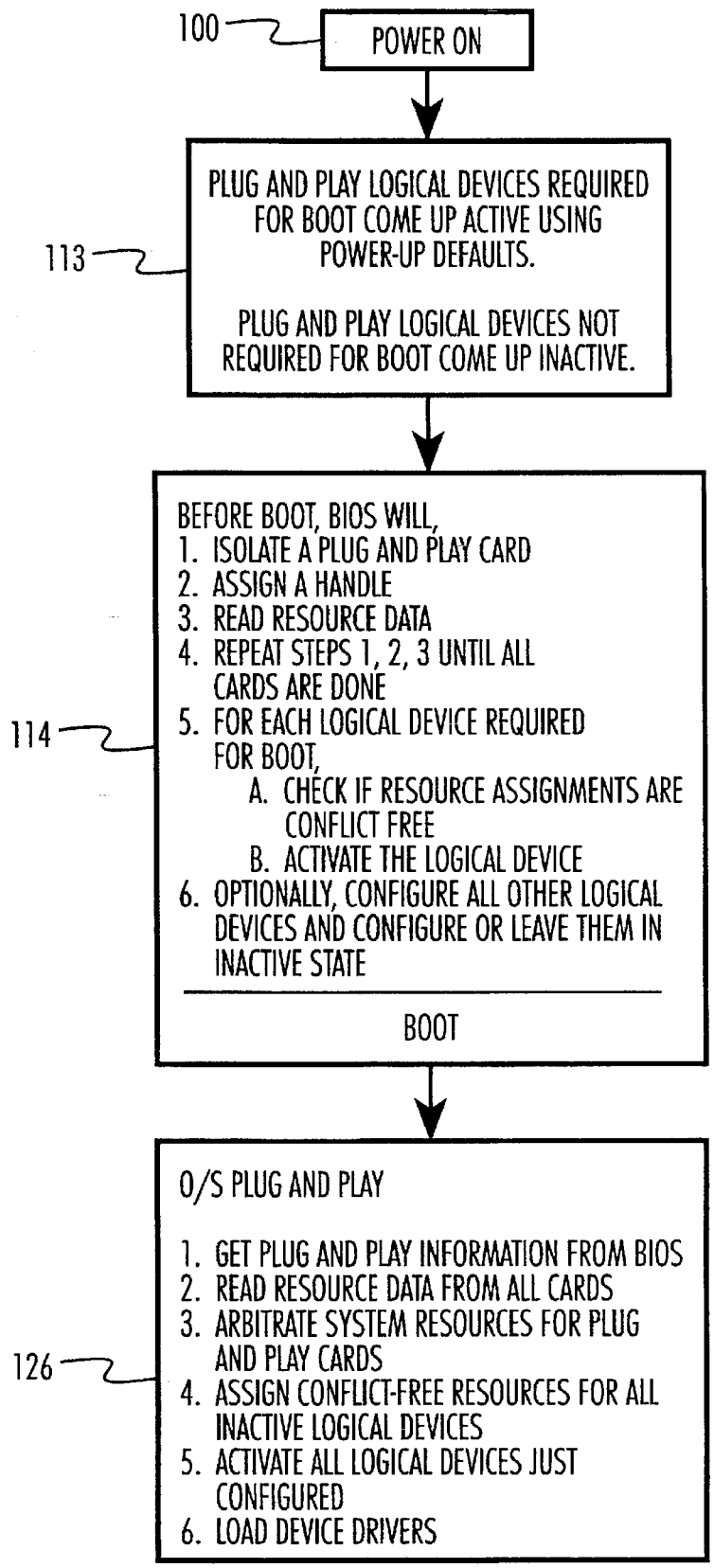
FIG. 2 illustrates the steps in the process of configuring a system using a PNP type ROM BIOS.
Figure 3:
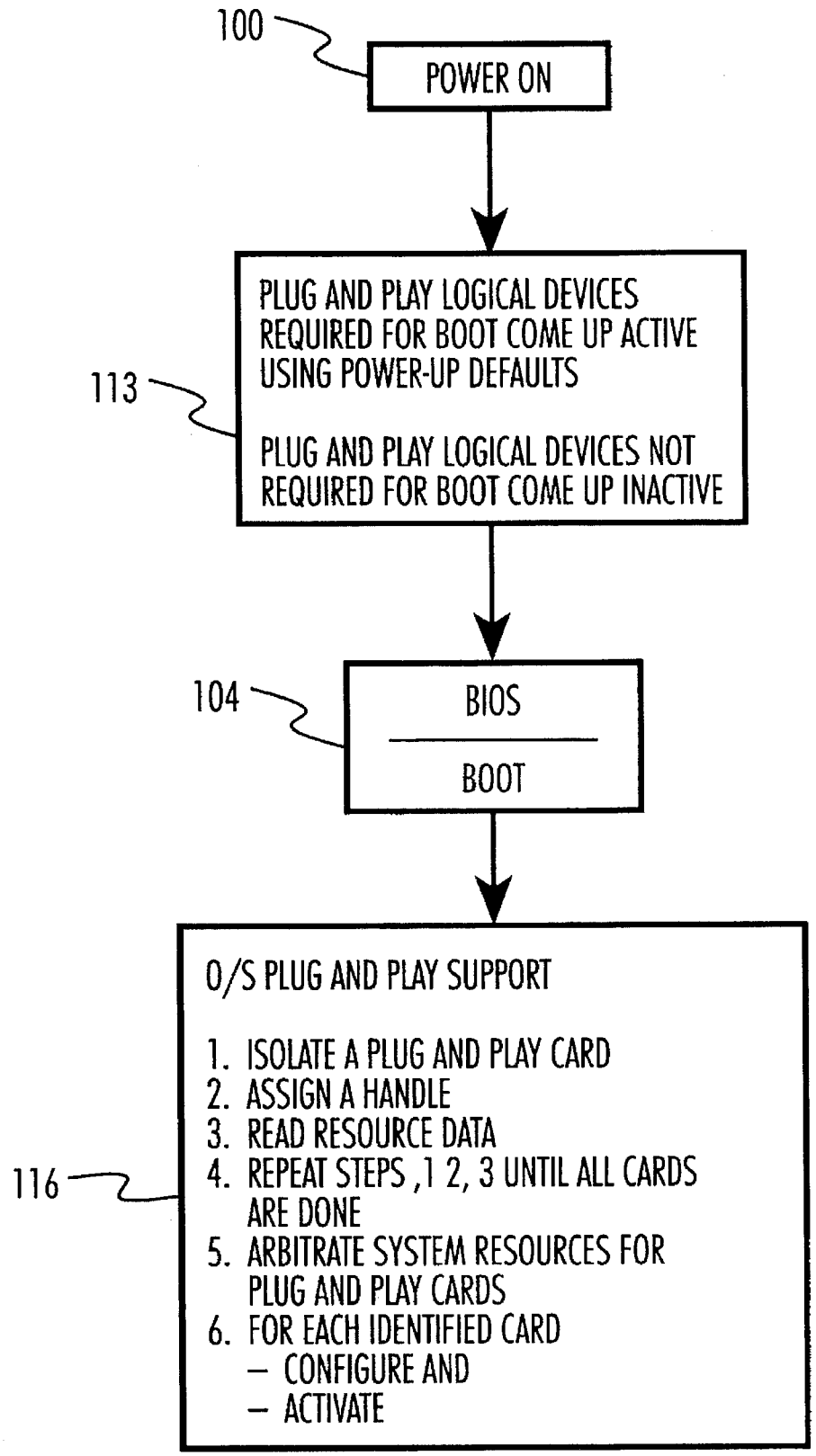
FIG. 3 illustrates the steps in powering up a computer using a PNP compatible operating system.
Figure 4:
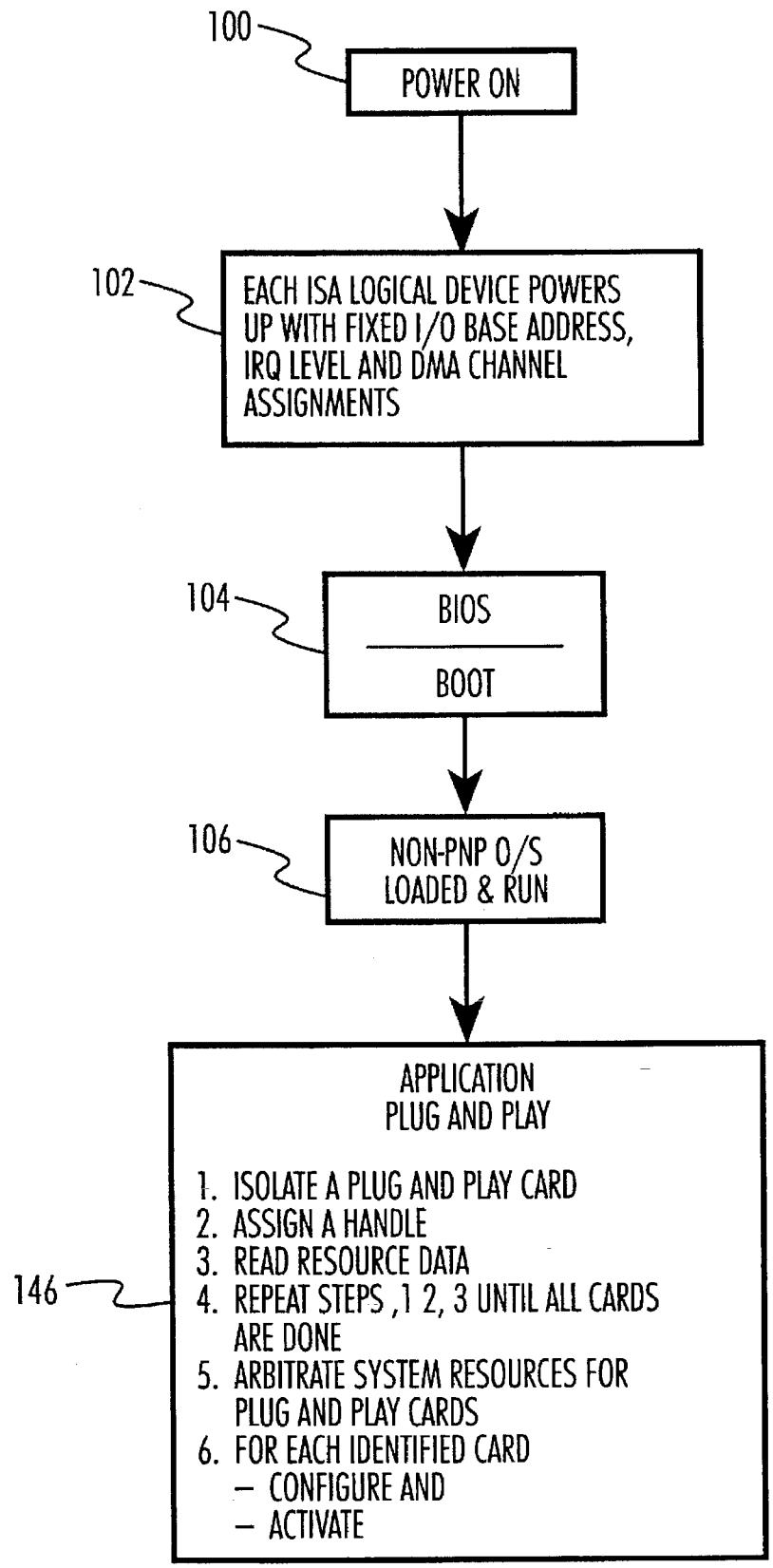
FIG. 4 illustrates a third embodiment for implementing PNP technology using applications software.
Figure 5:
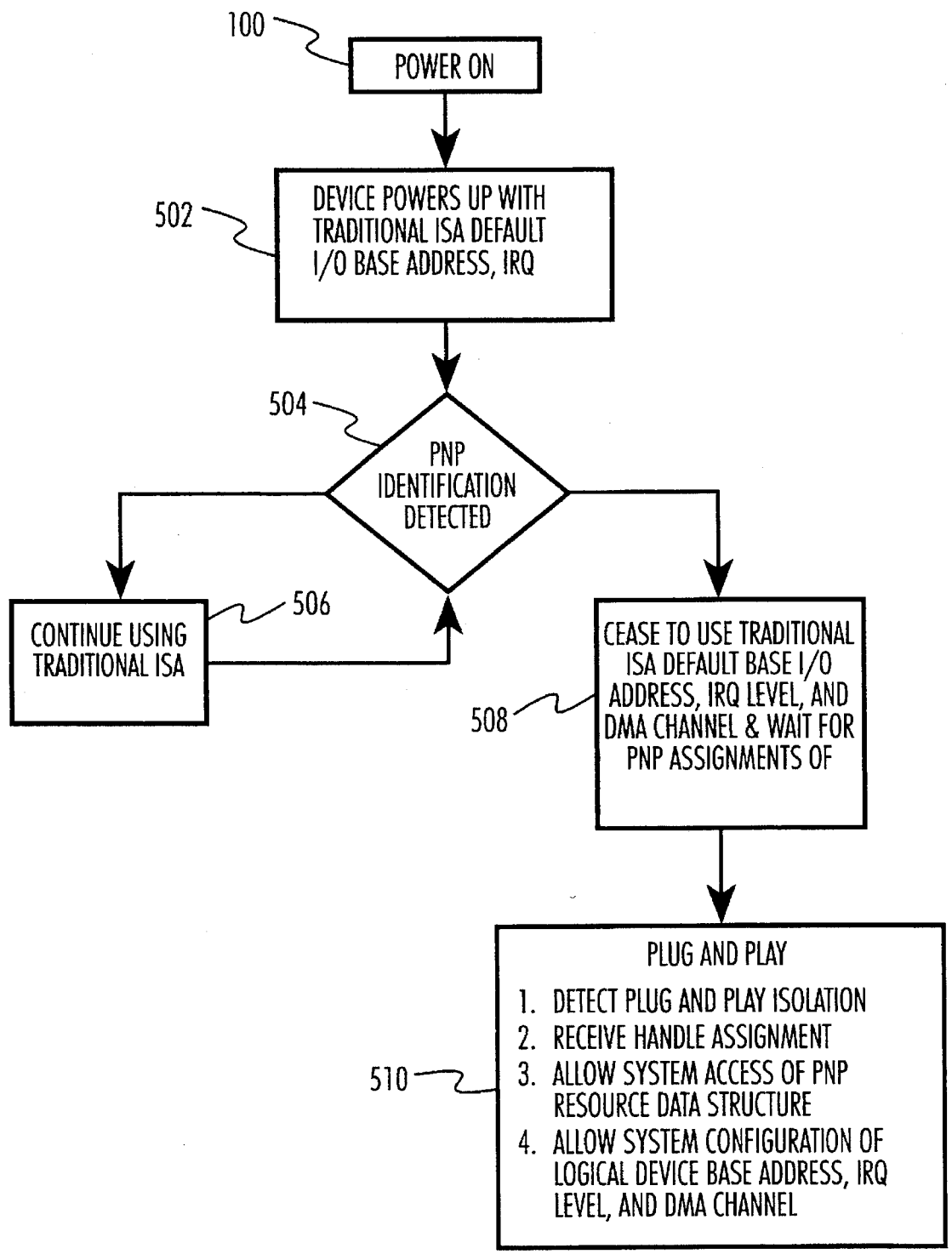
FIG. 5 illustrates the steps occurring in a device and system of the present invention upon power up.

FIG. 5 illustrates the steps occurring in a device and system of the present invention. In step 100, power is applied to a host system and the device of the present invention. In step 502, the device of the present invention powers up using a "traditional" configuration of I/O address, interrupt level, and DMA channel. Such traditional configurations may be determined by the ISA specification, or by general industry practice. For example, a hard drive controller may have an ISA specified I/O address which may be accepted by the computer industry. However, other devices, (e.g., Soundblaster™ sound card) may not have ISA specified configurations, however, by industry practice, have typical or traditional configuration accepted in the computer industry.

For example, for a device comprising a PCMCIA host adaptor, a traditional I/O address may be 03E0h (hexadecimal). A default or traditional interrupt level may be 15. For a default (legacy) mode of operation, DMA access may be disabled (i.e., no DMA channel). Note that some devices may or may not utilize an IRQ level or DMA channel either in legacy or PNP modes of operation.

In step 504, the apparatus of the present invention monitors the system bus to determine whether the system is attempting to identify plug and play devices within the system. If such an attempt is made by the system, then the apparatus of the present invention has determined it is operating in a plug and play environment and processing within the device passes to step 508. In step 508, the device ceases using the traditional configuration and awaits assignments by the plug and play firmware, operating system or software operating in the host computer, as shown in step 510.

If no plug and play identification procedure is detected in step 504, device processing continues to step 506, where the device continues to operate using its traditional ISA default values for I/O address, interrupt level and DMA channel. PNP detection may be continuous, as shown in FIG. 5, such that the apparatus of the present invention may continuously check for plug and play operation and reconfigure as necessary. Alternately, plug and play detection feature of the present invention may time out after a predetermined period after powerup and presume that plug and play support is not provided by the system.

A device operating according to the scheme of FIG. 5 may be installed in either a PNP type PC or a legacy type PC without the need for installing additional software or reconfiguring hardware by the user. In essence, the present invention provides true plug and play compatibility for both PNP and legacy type PCs. For the legacy user, the device of the present invention may be installed in a legacy PC without addition of any new operating system driver programs or BIOS ROM upgrades and operated according to traditional ISA defaults. For a PNP type PC user, operating a PC using PNP compatible firmware, operating system or applications software, the device will power up, detect that plug and play compatibility is present and allow itself to be configured by the PNP controlling firmware, operating system or applications software.

Figure 6:
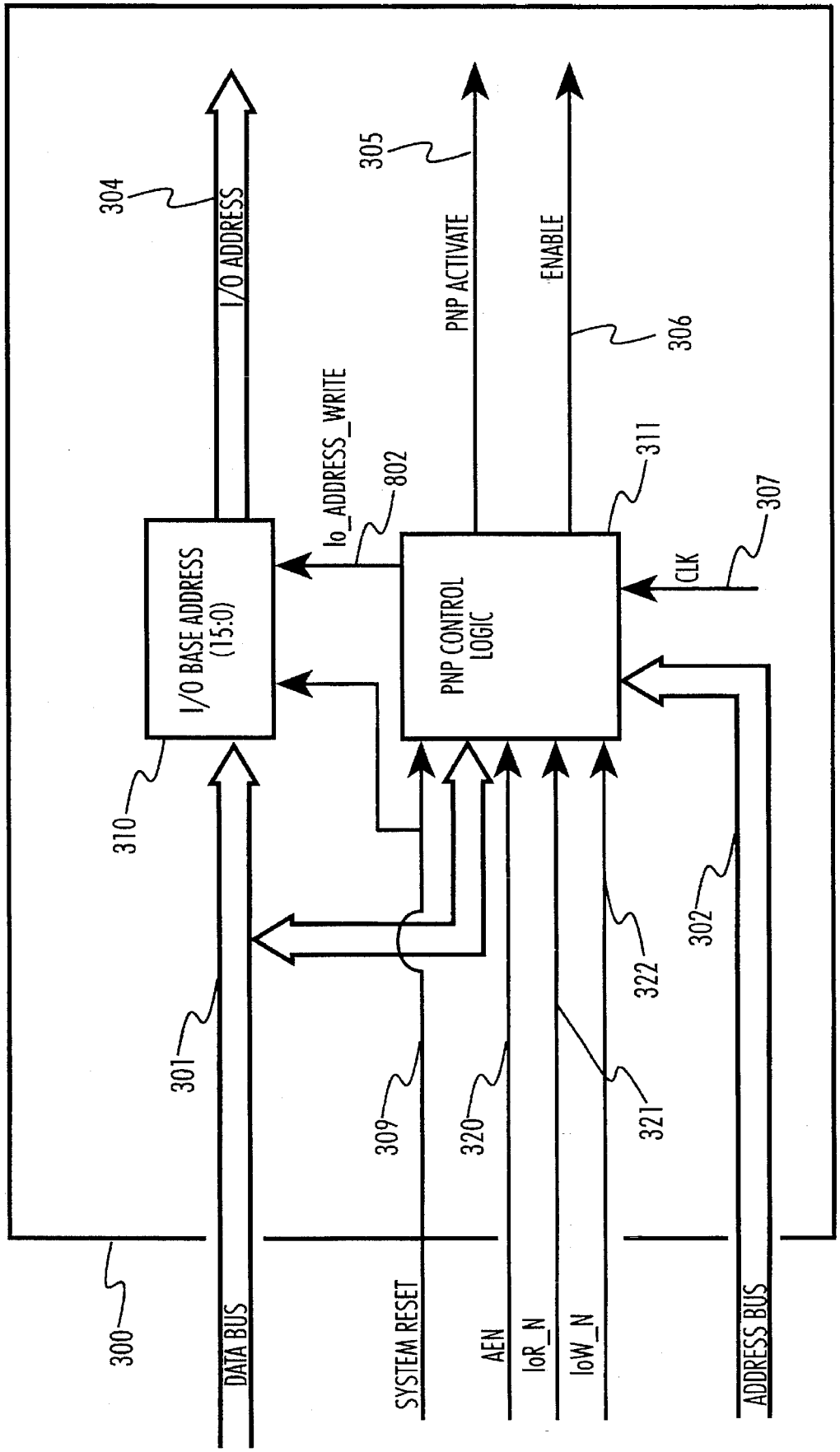
FIG. 6 is a simplified block diagram illustrating a device constructed according to the present invention.

FIG. 6 is a simplified block diagram of device 300 constructed according to the present invention. Device 300 may comprise, for example, a PCMCIA host adaptor configured as an add-on "card" for inserting into an expansion slot on a motherboard of a legacy type or PNP-type PC. Device 300 could comprise any other type of device discussed above or known in the art. Device 300 is provided coupled to host CPU system data bus 301 and address bus 302. System data bus 301 and address bus 302 are part of an overall system bus for a host CPU. The system bus may also include a control bus which includes read and write control lines IoR_N 321 and IoW_N 322. Device 300 may comprise, for example, a device provided as an add-on card for use with a host PC, or as a circuit or circuits built into a motherboard of a host PC. For the purposes of illustration, the remaining functional blocks of the overall device of which device 300 is a portion is not shown.

Within device 300, a register 310 may be provided which may comprise a sixteen bit register [15:0] for each logical device for storing a logical device's host I/O address. When system reset signal 309 is received, for example, on power up, register 310 may output a default address for each PNP logical device, for example, 03E0h (hexadecimal) for a PCMCIA controller. A logical device's I/O address stored in register 310 may then be output as I/O ADDRESS 304 to a bus interface unit (not shown) in device 300 which may utilize I/O ADDRESS 304 for interfacing with a host PC through system data bus 301 and address bus 302.

Figure 8:
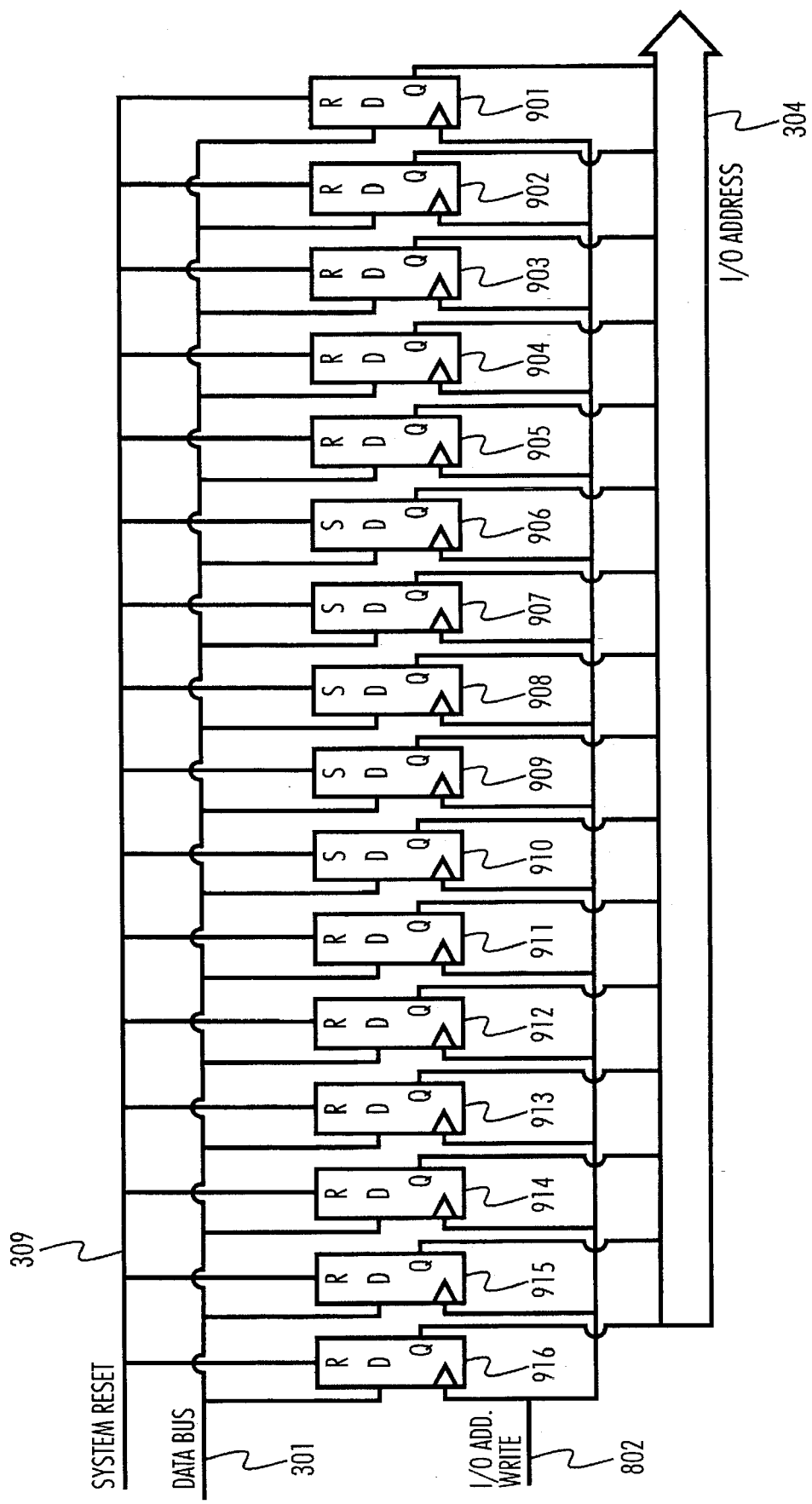
FIG. 8 is a simplified block diagram of I/O address register 310 of FIG. 6.

FIG. 8 illustrates the operation of I/O address register 310. Although shown here as a register, I/O address register 310 may be implemented using other storage means, without departing from the spirit and scope of the invention. For example, I/O address register 310 may comprise a portion of dynamic memory within a device. In the preferred embodiment, I/O address register 310 may comprise, a number of D-type flip-flops 901–916. Each flip-flop may be configured such that either its set (S) or reset (R) input is coupled to system reset line 309. Each flip-flop 901–916 may be configured to output a default address on system reset. For example, a default address of 03E0h (hexadecimal) is equivalent to 992 decimal or 0000001111100000 BCD (binary coded decimal). Thus, for the example illustrated in FIG. 8, flip-flops 901–905 and 911–916 may have their reset (R) inputs coupled to system reset line 309 so as to output a low level logic signal (0) when a system reset signal 309 is received. Flip-flops 906–910 may have their set (S) inputs coupled to system reset line 309 so as to output a high level logic signal (1) when system reset signal 309 is received. The outputs of flip-flops 901–916 are coupled to I/O address 304. I/O address 304 may be provided as a parallel output to a bus interface (not shown) within device 300.

Referring back to FIG. 6, on power up, PNP control logic 311 may be activated by system reset signal 309 and output logical device enable signal 306 to activate a logical device. PNP control logic 311 may be driven by clock 307 which may be slaved from a system clock (not shown) from a host PC, or may generated within device 300. If no PNP activity is detected on system data bus 301 by PNP control logic 311, device 300 may continue to operate a logical device using default address 03E0h. Thus, if device 300 is installed in a legacy PC, it may operate without the need for installing PNP firmware, operating system or applications software.

PNP control logic 311 monitors data and addresses received over system data bus 301 and address bus 302, respectively. If PNP control logic 311 detects that PNP firmware, operating system or applications software is active, a logical device within device 300 may be deactivated through device enable signal 306. PNP control logic 311 may then revert to a PNP control mode and await assignment of system resources and logical device activation by a host PC before re-enabling a logical device.

Figure 7:
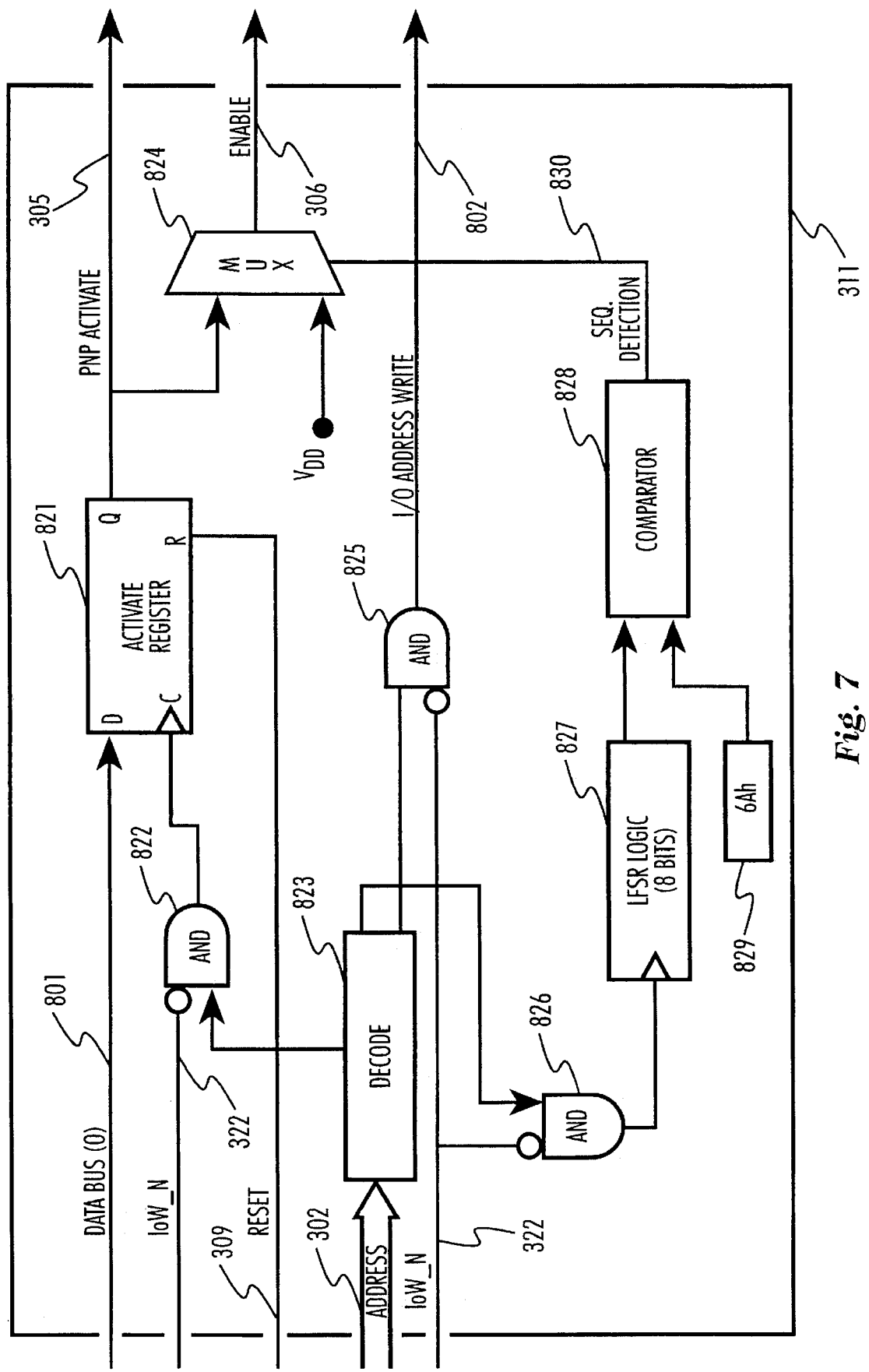
FIG. 7 is a simplified block diagram of PNP control logic 311 of FIG. 6.

FIG. 7 illustrates the operation of PNP control logic 311. In a PC system using PNP firmware, operating system or applications software, a series of I/O writes may be performed upon reset to a particular known I/O address used for PNP device identification and control. These writes follow a pattern which may easily detected and checked for by PNP control logic 311. This pattern is described on page 8 and Appendix B of the Plug and Play Specification, Version 1.0a dated May 5, 1994. The circuitry of FIG. 7 identifies this pattern and thus detects the presence of a PNP compatible system. The I/O port is monitored by PNP control logic 311 for this predetermined pattern of writes. If the pattern is matched over a predetermined number of writes (e.g., 32 or 64), PNP control logic 311 may determine that the device is operating in a PNP environment.

In FIG. 7, linear feedback shift register 827 is coupled to decoder 834 through AND gate 826. Decoder 823 decodes addresses from address bus 302. If a predetermined address is detected by decoder 823, an output signal is sent to AND gate 826. AND gate 826 receives as its other inverted input, I/O write signal IoR_N 322. When a predetermined address is detected by decoder 823, a corresponding write signal from IoR_N is passed to linear feedback shift register 827. Linear feedback shift register 827 may comprise, for example, an eight bit linear feedback shift register. The operation of such a linear feedback shift register to detect such predetermined patterns is shown, for example, on page 59 of the Plug and Play specification.

The output of linear feedback shift register 827 is compared to a predetermined known value, for example, 6Ah (hexadecimal) stored in register 829. This predetermined known value may comprise a signature which is characteristic of I/O writes performed by a PNP-type PC upon configuration. A PNP-type PC, during configuration, may repeat these I/O writes a predetermined number of times in sequence (e.g., 32 or 64). Thus, the "signature" of a PNP-type PC during configuration may be relatively unique. If comparator 828 finds a match between the output of linear feedback shift register 827 and the stored known value, comparator 828 outputs a signal to sequence detection circuit 830.

Also within PNP control logic 311 is activate register 821 activate register 821 may comprise, for example, a one bit register and may be coupled to system reset line 309 activate register 821 may output a zero value as activate signal 305 upon power up. Again, decoder 823 monitors address bus 302 to detect addressing from a host PC of locations defined for PNP device control. If such an address is detected an output signal is sent to AND gate 822. AND gate 822 receives at its inverted input I/O write signal IoW_N 322. The output of AND gate 822 serves as a clock signal for activate register 821.

Activate register 821 has its data port coupled to bit zero of system data bus 301 of FIG. 6 shown as DATA BUS(0) 801 if FIG. 7. If access of the register defined for PNP device control is detected, activate register 821 makes signal PNP ACTIVATE 305 equal to data received on DATA BUS(0) 801.

Thus, if device 300 is placed in a legacy system, output PNP ACTIVATE 305 of activate register 821 will go low on device reset and stay low. If device 300 is placed in a PNP-type host PC, output PNP ACTIVATE 305 will be low on reset, and will go high when the PNP configuration process writes to the I/O address determined to be for PNP control and activates the logical device by setting bit 0 to "1". When PNP ACTIVATE signal 305 goes high, it is a signal that PNP-type host PC is attempting to activate one or more logical devices within device 300.

PNP ACTIVATE signal 305 is also fed to MUX 824. MUX 824 outputs device enable signal 306 which enables a logical device of interest within device 300. MUX 824 receives as its other input, high level logic signal $V_{DD}$. MUX 824 is controlled by sequence detection signal 830. If device 300 is placed in a legacy type PC, no PNP characteristic I/O write sequence will be detected, and MUX 824 will output device enable signal 306 as high logic level signal $V_{DD}$. Since, in a legacy type PC, a PNP signal may generally not be detected, device enable signal 306 will stay high and a logical device of interest within device 300 will remain enabled and function as a non-PNP type device.

However, if sequence detection signal 830 goes high upon detection of PNP activity, MUX 824 will output as device enable signal 306, the logic level of PNP ACTIVATE signal 305. Thus, if device 300 is placed in a PNP system, a logical device of interest within device 300 will be active on power up until such time as the characteristic I/O write sequences produced by a PNP type PC are detected by linear shift feedback register 827 and comparator 828. At that time, MUX 824 is switched to output PNP ACTIVATE signal 305 as device enable signal 306. Initially, a logical device of interest within device 300 may be deactivated until such time as the PNP-type PC assigns system resources to the logical device of interest within device 300 and reactivates that logical device by writing a "1" to PNP activate register 821.

Decoder 823 also outputs a signal to AND gate 825 which receives at its inverted input I/O write signal IoW_N 322. If decoder 823 detects a predetermined address from address bus 302, an output signal is sent to AND gate 825. Input from I/O signal I0W_N 322 is then fed through AND gate 825 and output as I/O ADDRESS WRITE 802 signal to register 310.

As shown in FIG. 8, I/O ADDRESS WRITE signal 802 is received as a clocking signal for each of flip-flops 901–916 and clocks in data from system data bus 301. For the sake of illustration in FIG. 8, each line of data bus 301 is not illustrated. However, it can be appreciated that each data line of parallel system data bus 301 is coupled to a corresponding flip-flop 901–916 to load individual bits of data to each respective flip-flop 901–916. A new I/O address, received from the PNP-type host PC over data bus 301 may then be loaded into register 310, as shown in FIG. 8.

In this manner, a logical device within device 300 may switch from a legacy type operating mode to a PNP type operating mode without the need for moving jumpers, DIP switches or the like within device 300 or by loading specialized software.

For the purposes of illustration, the apparatus of FIGS. 6–8 illustrates how an I/O address may be configured on power up to operate in a legacy mode of operation, and switch to a pNP mode of operation upon indication of PNP activity on the system bus. It can be appreciated by one skilled in the art that the apparatus of FIGS. 6–8 can be altered to provide additional default addresses, for example IDE address, IRQ level or DMA channel which may be suitably altered by a PNP-type host PC when PNP firmware, operating system or applications software is activated.

Figure 9:
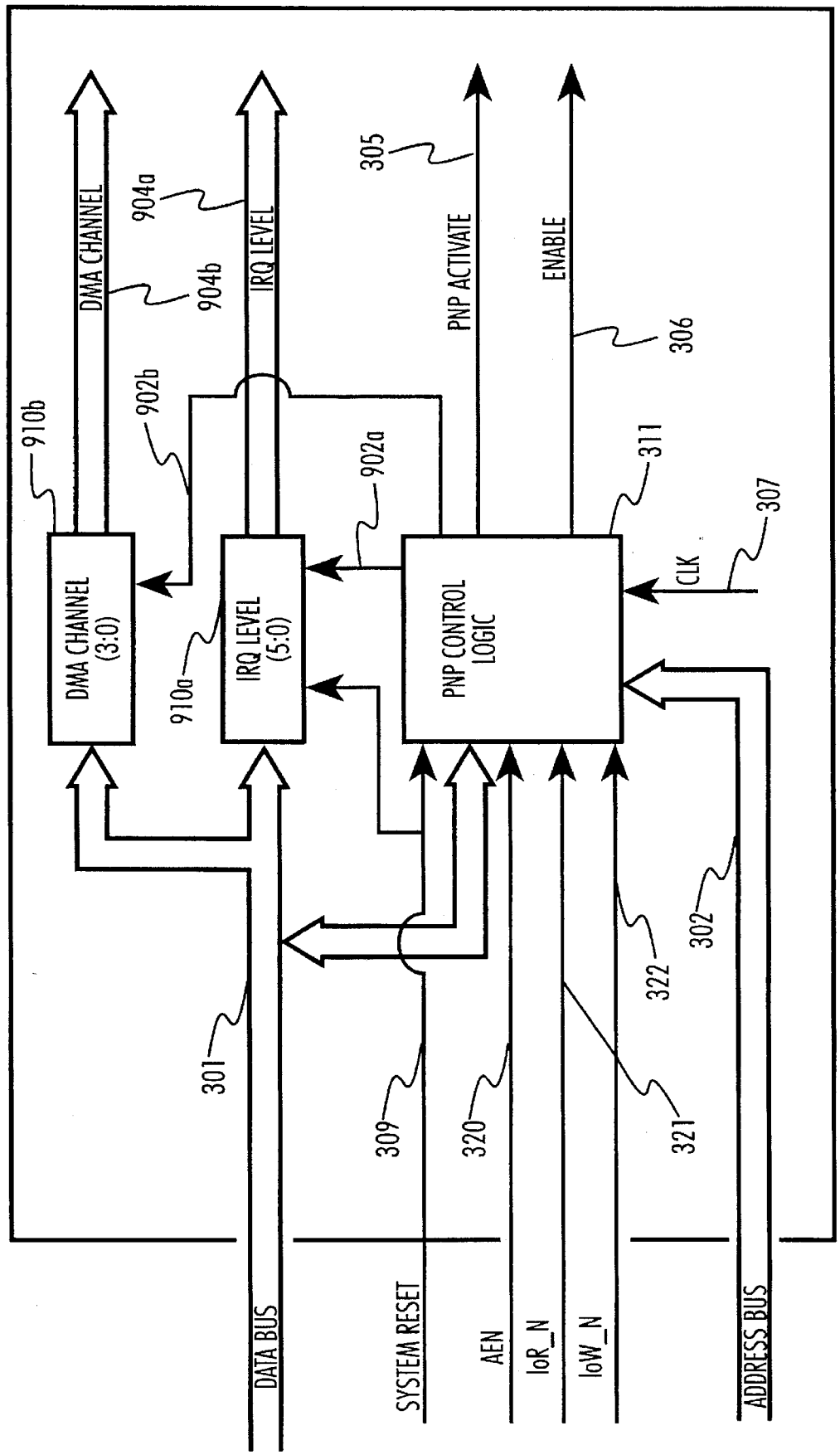
FIG. 9 is a simplified block diagram illustrating how the apparatus of FIG. 6 may be modified to include DMA channel and interrupt level registers.

FIG. 9 shows how additional data registers 910a and 910b may be added to the apparatus of FIG. 6 to provide DMA channel and IRQ level information. DMA channel register 910b, for example, may be a three bit register for storing a DMA channel number (0–7). Upon reset, a default DMA channel address may be provided for operation in legacy mode. Such a DMA channel address may also comprise a null value indicating that no DMA channel is assigned. If PNP activity is detected by PNP control logic 311, a DMA channel write signal 902b is output and a DMA channel number may be downloaded from a host PNP-type system to DMA channel register 910b.

Similarly, IRQ level register 910a may be provided for storing an IRQ (interrupt) level. Upon reset, a default IRQ level may be provided for operation in legacy mode. Such an IRQ level may comprise, for example, level 15 for a PCMCIA host adaptor. If PNP activity is detected by PNP control logic 311, an IRQ level write signal 902a is output and an IRQ level may be downloaded from a host PNP-type system to IRQ level 910a.

While the preferred embodiment and various alternative embodiments of the invention have been disclosed and described in detail herein, it may be obvious to those skilled in the art that various changes in form and detail may be made therein without departing from the spirit and scope thereof.

For example, while illustrated for use in ISA type PNP systems, the present invention may also be applied to plug and play type technology utilized in other types of computer architectures (e.g., Macintosh™, Microchannel™ or the like). Similarly, while the present invention has been illustrated for use in a DOS or Windows™ operating system, the present invention may be applied to other types of operating systems (e.g., UNIX™, Macintosh™, OS-2™, or the like) without departing from the spirit and scope of the invention.

What is claimed is:

1. A backward compatible plug and play device for adaptive use with a computer of either a PNP or a legacy non-PNP type having system data and address busses, said device being coupled to said computer system data and address busses, said device comprising:

first storage means, coupled to said computer system data bus, for storing an I/O address for the device, wherein said first storage means outputs a default I/O address upon power-up;

a DMA channel register, coupled to said computer system data bus, for storing a DMA channel value for the device, wherein said DMA channel register outputs a default DMA channel value upon power-up;

an interrupt level register, coupled to said computer system data bus, for storing an interrupt level value for the device, wherein said interrupt level register outputs a default interrupt level value upon power-up; and control logic, coupled to said first storage means, said computer system address bus and said computer system data bus, wherein said control logic:

upon detecting activity on said computer system data bus characteristic of a computer system attempting to assign I/O addresses to a device, disables said device and allowes a computer system to write to said first storage means an I/O address;

upon detecting activity on said computer system data bus characteristic of a computer system attempting to assign DMA channel value to a device, allows a computer system to write to said DMA channel register a DMA channel value; and upon detecting activity on said computer system data bus characteristic of a computer system attempting to assign interrupt level value to a device, allows a computer system to write to said interrupt level register an interrupt level value.

2. The device according to claim 1, wherein said control logic comprises:

a linear feedback shift register, coupled to said address bus and a write signal from said computer system, for receiving an initiation key comprising a predetermined data sequence; and a comparator, coupled to said linear feedback shift register, for comparing a received data sequence from said linear feedback shift register with the predetermined data sequence, said comparator outputting a comparison signal when a received data sequence is comparable to the predetermined data sequence, wherein said comparison signal indicates an attempt by the computer system to initiate a routine to assign I/O addresses to devices.

3. The device according to claim 2, wherein said control logic further comprises:

a multiplexer, coupled to a high level logic signal, for generating a high level logic signal as a device enable signal upon reset and power-up, said multiplexer having another input coupled to said system data bus for receiving a signal characteristic of a computer system attempting to enable a device after assigning an I/O address, said multiplexer receiving as a switching signal said comparison signal from said comparator.

4. The device according to claim 3, wherein said control logic further comprises:

an activation register, coupled to said computer system data bus and said multiplexer, for detecting a signal from said computer system indicating an attempt by said computer system to activate a device after assigning an I/O address, said activation register outputting a signal to said device and said multiplexer indicative of such detection.

5. The device according to claim 4, wherein said control logic further comprises:

a decoder, coupled to said computer system address bus, for detecting a computer system address corresponding to a command for activating a device and outputting a signal indicative of such detection.

6. A method for adaptively operating a backward compatible plug and play device with a computer of either a PNP or a legacy non-pNP type having system data and address busses, said device being coupled to said computer system data and address busses, said method comprising the steps of:

storing, in a first storage means coupled to said computer system data bus, a default I/O address upon power-up;

storing, in a DMA channel register coupled to said computer system data bus, a default DMA channel value upon power-up;

storing, in an interrupt level register coupled to said computer system data bus, a default interrupt level value upon power-up;

detecting activity on said computer system data bus characteristic of a computer system attempting to assign I/O addresses to devices; and allowing a computer system to write to said first storage means an I/O address upon detection of said activity.

7. The method of claim 6, further comprising the step of: disabling said device upon detection said activity.

8. The method of claim 6, further comprising the step of:

receiving in a linear feedback shift register, an initiation key comprising a predetermined data sequence, comparing a received data sequence from said linear feedback shift register with the predetermined data sequence, and outputting a comparison signal when a received data sequence is comparable to the predetermined data sequence, wherein said comparison signal indicates an attempt by the computer system to initiate a routine to assign I/O addresses to devices.

9. The method of claim 8, further comprising the steps of:

generating a device enable signal upon reset and powerup, receiving a characteristic signal of a computer system attempting to enable a device after assigning an I/O address, and terminating the device enable signal upon reception of the characteristic signal.

10. The method of claim 9 further comprising the steps of:

detecting a signal from said computer system indicating an attempt by said computer system to activate a device after assigning an I/O address, and outputting a signal to said device and said multiplexer indicative of such detection.

11. The method of claim 10, further comprising the step of:

detecting on the computer system address bus, a computer system address corresponding to a command signal for activating a device, and outputting a signal indicative of such detection.

12. The method of claim 7, further comprising the steps of:

detecting activity on said computer system data bus characteristic of a computer system attempting to assign DMA channel values to devices and allowing a computer system to write to said DMA channel register a DMA channel value.

13. The method of claim 7, further comprising the steps of:

detecting activity on said computer system data bus characteristic of a computer system attempting to assign interrupt level values to devices and allowing a computer system to write to said interrupt level register an interrupt level value.

* * * * *